United States Patent [19]

Terai et al.

[11] Patent Number: 4,956,848
[45] Date of Patent: Sep. 11, 1990

[54] ELECTRODES FOR GAS APPARATUS AND METHOD OF MAKING THE SAME

[75] Inventors: Kiyohisa Terai; Koichi Nishida, both of Yokohama, Japan

[73] Assignee: Kabushiki Kaisha Toshiba, Kawasaki, Japan

[21] Appl. No.: 356,420

[22] Filed: May 25, 1989

[30] Foreign Application Priority Data

Jun. 15, 1988 [JP] Japan .................. 63-147650

[51] Int. Cl.$^5$ ............................................. H01S 3/097
[52] U.S. Cl. ...................................... 372/87; 372/85; 372/55; 372/56
[58] Field of Search ................ 372/85, 87, 88, 74, 372/55, 56, 61

[56] References Cited

U.S. PATENT DOCUMENTS

| | | | |
|---|---|---|---|
| 3,962,656 | 6/1976 | Peressini | 372/74 |
| 4,574,380 | 3/1986 | Nam | 372/87 |
| 4,639,926 | 1/1987 | Wang et al. | 372/87 |
| 4,821,280 | 4/1989 | Kawase | 372/88 |

Primary Examiner—William L. Sikes
Assistant Examiner—Georgia Y. Epps
Attorney, Agent, or Firm—Foley & Lardner, Schwartz, Jeffrey, Schwaab, Mack, Blumenthal & Evans

[57] ABSTRACT

In a gas laser, an anode of discharge electrodes is formed from stainless steel. Alternatively, the anode is formed from a metallic base material and chromium coating is applied on the surface of the metallic base material. A cathode is formed from titanium as a base material and the surface thereof is oxidized. Alternatively, the cathode is formed from molybdenum as a base material and titanium coating is applied on the surface of the molybdenum base material. The surface of the cathode is oxidized.

5 Claims, 4 Drawing Sheets

ELECTRODES FOR GAS APPARATUS AND METHOD OF MAKING THE SAME

BACKGROUND OF THE INVENTION

The present invention relates to a gas laser apparatus of the type wherein a pair of discharge electrodes are disposed so as to be placed in an atmosphere of a gas mixture as a laser medium, and more particularly to an improvement of a material of the anode of the discharge electrodes of the gas laser apparatus.

As the gas laser of the above-mentioned type, a $CO_2$ laser has been used for material processing. The $CO_2$ laser generally comprises a discharge section filled with a gas mixture as a laser medium, a plurality of anode bars provided in the discharge section so as to be arranged in the shape of a reed screen, and a plurality of generally L-shaped cathode bars disposed in opposite relation to the anode bars. A high voltage DC power supply is connected between the discharge electrodes through ballast resistances. DC voltage is applied across the discharge electrodes, causing a glow discharge to take place between the electrodes and thereby exciting the gas mixture. The gas mixture is recirculated through a heat exchanger from the cathode side to the anode side for the purpose of preventing the temperature thereof from being increased. Molybdenum has been conventionally employed as a material of the cathode and copper or molybdenum has been employed as that of the anode.

In the laser apparatus introduced to a production line of a works for the purpose of the material processing not studying, it is desirable that the maintenance cycle of the laser apparatus be as long as possible since the maintenance cycle affects productivity of the production line. While, in the conventional $CO_2$ laser, the discharge electrodes are deteriorated and the electric discharge in the discharge section of the laser is altered from the glow to arc discharge when the maintenance of the electrodes is not executed. Under these circumstances, the maintenance of the discharge electrodes needs to be reiteratively executed in a relatively short cycle. For example, the conventional transverse flow 5-kW gas laser is continuously used for about 200 hours at the maximum.

The inventors of the present invention made experiments to investigate the mechanism of deteriorating the discharge electrodes. From the experiments, the inventors have found that a physical sputtering action is applied to the cathode formed from molybdenum owing to collision of positive ions during the glow discharge. Further, since molybdenum has a sublimation temperature as low as below 700° C., molybdenum is also likely to suffer from the chemical sputtering action. Consequently, the discharge electrodes are deteriorated owing to both physical and chemical sputtering actions.

On the other hand, inspection of the copper anode after a long time of use shows that a thin oxide film is formed on the whole surface of the copper anode. It is considered that the anode surface is oxidized by an extremely small amount of oxygen contained in the gas mixture. It is further considered that the oxygen results from the leakage through sealing members of an airtight vessel of the gas laser apparatus or decomposition of $CO_2$ contained in the gas mixture as the laser medium. Inspection of the copper anode after a long time of use further shows that a piled or stacked substance about 1 or 2 $\mu$m thick is found on the side thereof confronting the cathode and that black projections, the diameter of each of which is about 100 $\mu$m thick are found on the surface thereof. Since the piled substance is amorphous $MoO_3$ and partial to the side of the anode confronting the cathode, it is considered that the above-described sputtering in the cathode causes cathode material particles to scatter and move to the anode with a flow of the gas mixture, resulting in the substance piled up on the anode. Further, analysis shows that the projections formed on the piled substance are composed of carbon. Consequently, it is considered that the projections are micro-arc generating points. From the above-described results of analysis, mechanism leading from the deterioration of the discharge electrodes to the generation of micro-arcs is considered as follows: when the anode surface temperature is raised owing to an electric discharge between the discharge electrodes, the anode surface is ununiformly oxidized since the anode is formed from copper which is easily oxidized. Simultaneously, the molybdenum cathode suffers from the sputtering action owing to the electric discharge and the cathode material particles are caused to scatter with flow of the gas mixture and affixed to the anode to be piled up thereon as molybdenum oxide under the influence of the ununiform oxide film formed on the anode. The piled substance is an oxide and therefore, has an insulating property. Consequently, concentration of electric field takes place on some portions of the anode surface. Micro-arcs are generated as the result of the electric field concentration. As the number of the micro-arc generating points is increased, the electric field further tends to be concentrated on the micro-arc generating points, resulting in further ununiformity of the discharge input. The discharge input locally reaches the arc limit or above and at last, the glow discharge is altered to the arc discharge throughout the discharge section.

So far as described, the conventional gas laser has a problem that the oxide produced owing to the ununiform oxidation of the anode surface is piled up on the anode ununiformly and that deterioration of the discharge electrodes lowers the arc limit, thereby requiring the maintenance in a short period.

SUMMARY OF THE INVENTION

Therefore, an object of the present invention is to provide a gas laser apparatus wherein the anode of the discharge electrodes can be prevented from being deteriorated such that the maintenance cycle thereof is improved.

In order to achieve the object, the gas laser apparatus of the present invention has an electric discharge caused between a cathode and an anode both placed in an atmosphere of a gas mixture as a laser medium, thereby exciting the gas mixture. The cathode is formed from stainless steel or other metallic material as a base material with the surface being chrome plated.

The stainless steel is an alloy mainly composed of iron, nickel and chromium and highly resistant to the oxidation because of its chromium component, resulting in a considerably low oxidation rate. Further, since a stable thin chromium oxide film is formed on the surface of the anode, the cathode material is prevented from being ununiformly oxidized to become a piled insulating substance on the anode even when the cathode material particles are caused to scatter and be affixed to the anode. Further, the anode itself is difficult to be oxidized, thereby preventing electric field concentration owing to the piled insulating substance.

Where chromium is coated on the base material of the anode, a stable thin chromium oxide film is also formed on the surface of the anode, as in the stainless steel anode. Consequently, growth of the insulating substance piled up on the anode surface may be restrained. Chromium may be coated on the anode surface by way of electroplating, chemical plating, vaporization, sputtering, ion plating or laser cladding, as well known in the art.

Where the anode is formed as described above and the cathode is formed so as to have the titanium oxide surface, the sputtering in the cathode is reduced and consequently, the affixing and growth of the insulating substance piled on the anode may be restrained. More specifically, since the titanium oxide is an exceedingly stable substance, it has a small sputtering rate and is not likely to suffer from the physical sputtering. Furthermore, since the vapor pressure is relatively low when the atmospheric temperature is high, titanium oxide is not likely to suffer from the chemical sputtering. The vapor pressure takes the value of $10^{-6}$ torr when the temperature of $TiO_2$ is approximately 1530° C., while the temperature of $MoO_3$ is increased only to 490° C. under the same vapor pressure conditions. Consequently, the insulating substance resulting from the sputtering may be prevented from being piled up on the anode. Furthermore, the surface state of titanium oxide itself is stable, which further prevents the electric field concentration and therefore, occurrence of micro-arcs.

The cathode having the titanium oxide surface may be obtained in the following methods. In a first method, the cathode is formed from titanium as a base material. Prior to incorporation of the cathode into the gas laser apparatus, the cathode is baked in the atmosphere so that the surface thereof is oxidized. In a second method, the cathode is formed from titanium as the base material and incorporated into the gas laser apparatus. When the electric discharge is initiated in the usual manner, heat owing to the electric discharge is applied to the base material of titanium and an extremely small amount of oxygen contained in the gas mixture as the laser medium causes the base material to be oxidized, thereby obtaining the surface of titanium oxide. In a third method, the cathode is formed from molybdenum as the base material. Titanium is then affixed to the surface of the cathode by way of sputtering, ion plating, laser cladding or the like. Then, the cathode is previously baked or incorporated in the gas laser apparatus so that the electric discharge is initiated, whereby the surface of the cathode is oxidized.

Other and further objects of this invention will become obvious upon an understanding of the illustrative embodiments to be described or will be indicated in the appended claims, and various advantages not referred to herein will occur to one skilled in the art upon employment of the invention in practice.

DESCRIPTION OF THE PREFERRED EMBODIMENTS

A first embodiment wherein the gas laser apparatus of the present invention is applied to a $CO_2$ laser for material processing will now be described with reference to FIGS. 1 to 5 of the accompanying drawings.

Figure 1:
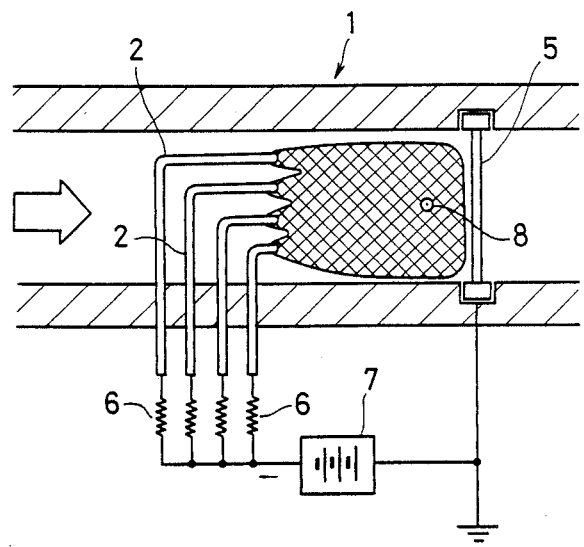
FIG. 1 is a cross sectional view of the discharge section of the gas laser of a first embodiment.

Referring first to FIG. 1, a gas mixture as a laser medium is caused to flow from the left-hand side to the right-hand side of an inner cavity of a discharge section 1, as viewed in FIG. 1. The gas mixture is cooled by a heat exchanger (not shown) and recirculated through the cavity of the discharge section 1. He, $N_2$ and $CO_2$ composing the gas mixture are in the ratios of 50:45:5. It is understood that an extremely small amount of oxygen or the like is contained in the gas mixture. The pressure of the gas mixture is about 30 torr and the flow rate thereof in the discharge section is about 70 m/sec. in the center of the cavity.

Figure 2:
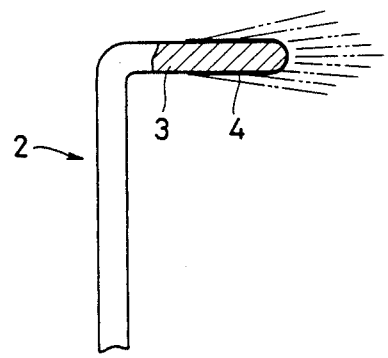
FIG. 2 is a partially cross sectional view of the cathode employed in the gas laser apparatus.

Each cathode bar 2 composing discharge electrodes comprises a generally L-shaped slender electrode bar. A plurality of such cathode bars 2 are adjacently aligned so that ends thereof are directed to the same direction. As schematically shown in FIG. 2, each cathode bar 2 is formed from titanium as a base material 3. A thin titanium oxide film 4 is formed on the surface of a lightening portion of each cathode bar 2. The lightening portion is a portion covered with a glow during the discharge.

Each anode bar 5 composing the discharge electrodes comprises a slender electrode bar extending vertically. A plurality of such anode bars 5 are adjacently aligned so as to take the form of a reed screen. Each anode bar 5 is formed from stainless steel.

A DC power supply 7 is connected between the electrodes 2 and 5 through ballast resistances 6 each having the resistance of 20 KΩ so that high DC voltage is applied across the electrodes 2 and 5. When the DC voltage is applied across the electrodes 2 and 5 with the gas mixture being flown through the cavity of the discharge section 1, a glow discharge is initiated between the electrodes 2 and 5. An area of the cavity in which a glow exists is shown by crossed oblique lines in FIG. 1. A lightening portion of each cathode bar 2 where each cathode bar 2 is covered with the glow is subject to changes of the gas pressure or the like. In the embodiment, the lightening portion of each cathode bar 2 is in the range between 10 mm and 20 mm from the distal ends of the cathode bars 2. Upon occurrence of the glow discharge, $CO_2$ in the gas mixture is excited and laser oscillation takes place between conventional resonators each provided with a reflector (not shown). A beam axle is designated by reference numeral 8 in FIG. 1.

Figure 3:
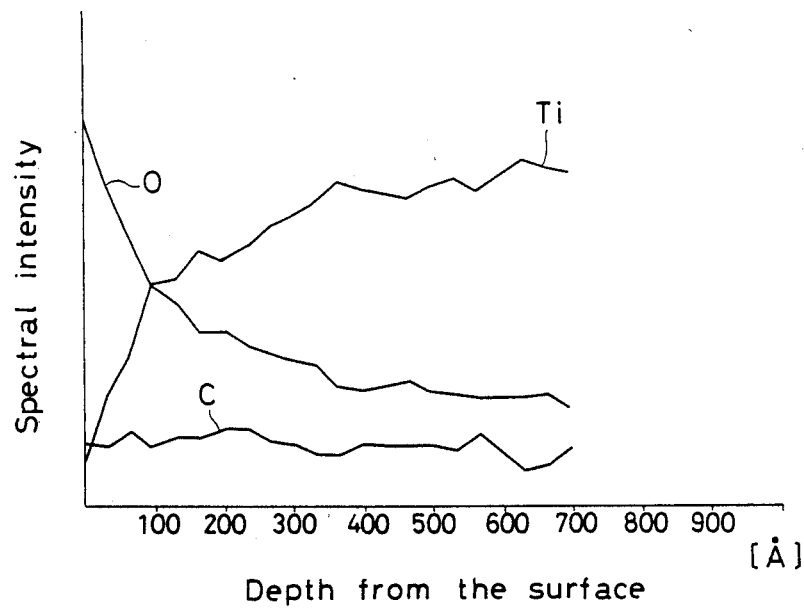
FIG. 3 is a graph representing the result of elemental analysis in the direction of the depth of the cathode before the discharge is initiated.
Figure 4:
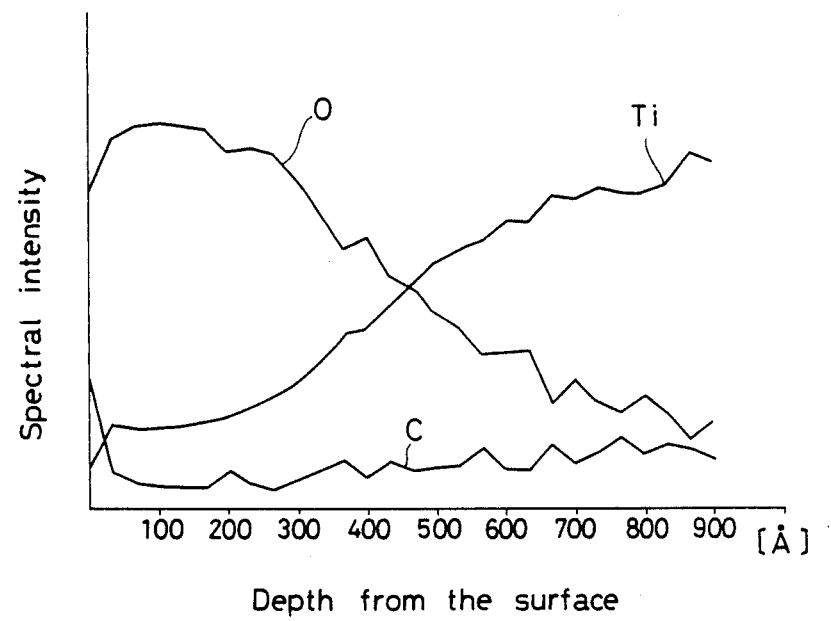
FIG. 4 is a graph representing the result of elemental analysis in the direction of the depth of the cathode at the time when 200 hours elapses from the initiation of discharge.

Each above-described cathode bar 2 having a thin titanium oxide film 4 is formed as follows: the whole cathode bar 2 is first formed from titanium and incorporated in the discharge section 1 of the gas laser apparatus. The electric discharge is then initiated between the electrodes 2 and 5 in the same manner as in the normal usage of the apparatus. The cathode bars 2 are heated by the glow and the surface of each cathode bar 2 is oxidized owing to an extremely small amount of oxygen contained in the gas mixture, thereby forming a thin titanium oxide film on the surface of each cathode bar 2. For reference, FIGS. 3 and 4 show the results of an elemental analysis of the cathode in the direction of its depth before occurrence of the electric discharge and after the discharge for 200 hours, in accordance with an analysis method based on the Auger effect, respectively. The transverse axis represents the depth from the surface of the cathode and the vertical axis the elemental ratio based on the spectral intensity, in each graph. The graphs show that a thin titanium oxide film of about 500 Å thick is formed on the surface of the cathode formed from titanium as the base material after the electric discharge for 200 hours. The thickness of the titanium oxide film thus formed is nearly proportional to the discharging period.

According to the above-described construction, each anode bar 5 suffers oxidation owing to the high atmospheric temperature due to the electric discharge and an extremely small amount of oxygen contained in the gas mixture. Since each anode bar 5 is formed from stainless steel and is highly resistant to the oxidation because of the existence of chromium component therein, the rate at which each anode bar 5 is oxidized is extremely low and the surface thereof is covered with a stable chromium oxide thin film. Consequently, even when the cathode material particles are caused to scatter owing to the sputtering in the cathodes 2 and start to affix on the anode surface, the cathode material particles affixed on the anode surface may be prevented from becoming a local insulating substance by suffering the ununiform oxidation action since the surface of each anode bar 5 is covered with the stable chromium oxide thin film, resulting in prevention of electric field concentration.

In the embodiment, particularly, titanium is employed for the base material 3 of each cathode bar 2 and the thin titanium oxide film 4 is formed on the cathode surface. Consequently, the amount of substance piled on the anode surface owing to the sputtering may be reduced. From the foregoing, since a time period between the local occurrence of a micro-arc and occurrence of an arc discharge may be sufficiently lengthened and a stable electric discharge may be ensured for a long period of time, the maintenance cycle of the gas laser may be sufficiently lengthened and the productivity of the production line in which the gas laser is introduced may be improved to a large extent.

Figure 5:
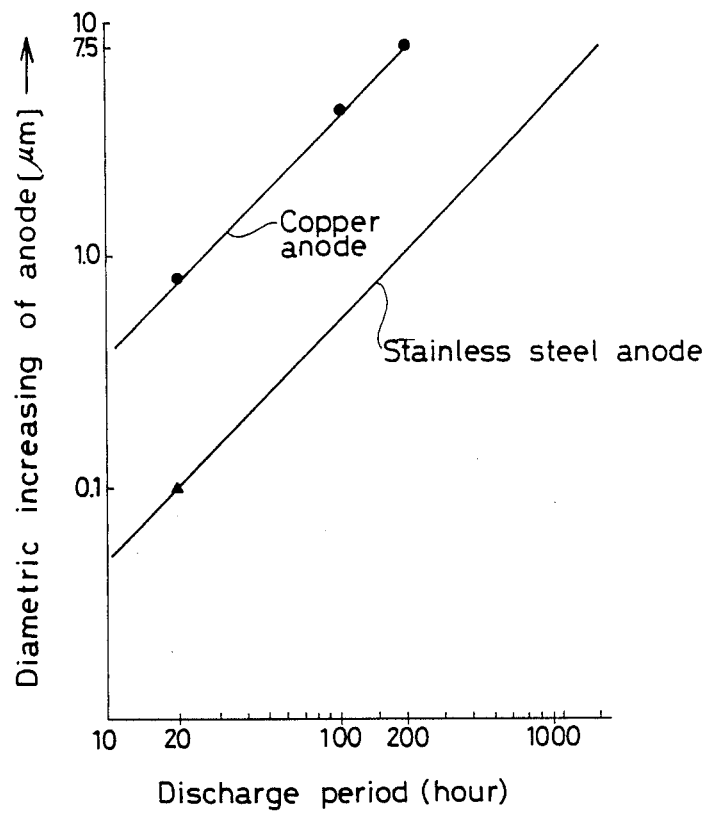
FIG. 5 is a graph representing the relationship between the increasing of the anode diameter and the discharge period.

FIG. 5 shows the result of an experiment in which the titanium base material 3 having a diameter of 2 mm is employed for each cathode bar 2 and copper and stainless steel anode bars each of which has the diameter of about 2 are employed. As shown in FIG. 5, the diameter of the copper anode bar is increased by 0.8 $\mu$m in the operational period of 20 hours, by 4 $\mu$m in the operational period of 100 hours, and by 7.5 $\mu$m in the operation period of 200 hours owing to the oxidation thereof itself and the affixing of cathode material particles thereon due to the sputtering. However, the diameter of the stainless steel anode 5 is only increased by 0.1 $\mu$m in the operational period of 20 hours, a value one eighth of that of the copper anode. The period in which the diameter of the stainless steel anode reaches that (increase by 7.5 $\mu$m) of the copper anode after operation for 200 hours is 1,500 hours, which corresponds to a value 7.5 times as long as that of the copper anode. Accordingly, although the maintenance cycle of the conventional copper anode is limited to approximately 200 hours, the embodiment provides for the maintenance cycle of 1,500 hours.

Figure 6:
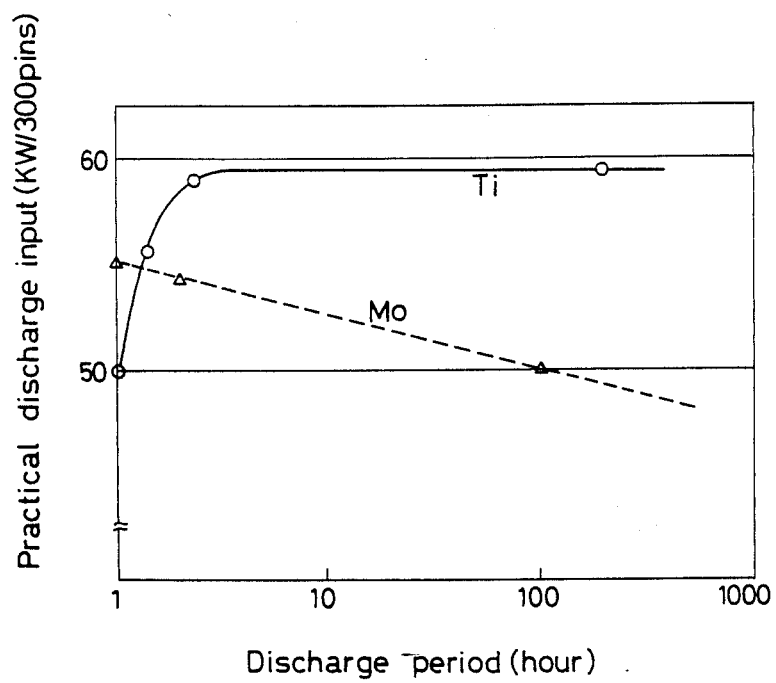
FIG. 6 is a graph representing the relationship between practical discharge input and discharge period.

FIG. 6 shows the relationship between the practical discharge input and the discharging period in the case of a transverse flow 5-kW gas laser. The transverse axis in FIG. 6 denotes the logarithmic scale. As obvious from FIG. 6, the practical discharge input is gradually decreased in the conventional gas laser in which both of the discharge electrodes are formed from molybdenum and the life of each electrode is considered to be limited to approximately 100 hours. However, in the gas laser apparatus of the embodiment wherein the stainless steel anode 5 and titanium cathode 2 are employed, the practical discharge input may be maintained at a high level even after the operational period of 200 hours. As understood from FIG. 6, the titanium cathode 2 shows a tendency that the practical discharge input is low at an initial stage of the discharge operation of the gas laser apparatus and increased as the discharge operation of the apparatus is reiterated. However, when the process of baking the cathode 2 is performed for a longer period than in the conventional apparatus in the test operation at the time of forwarding or shipment from a works, the practical discharge input may be initially maintained at a sufficiently large value.

Figure 7:
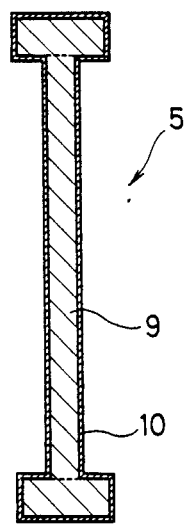
FIG. 7 is a partially cross sectional view of an anode employed in the gas laser of a second embodiment.

FIG. 7 schematically illustrates a second embodiment of the invention. The anode 5 is formed from a metallic base material 9 and a chromium layer 10 is coated on the base material 9. Since a stable thin chromium oxide film is formed on the anode surface, the anode 5 may not be formed from stainless steel as in the foregoing embodiment.

Since the cathode 2 is formed from titanium in the first embodiment, the sputtering in the cathode 2 may be prevented and deterioration of the anode 5 may be effectively restrained. While, where the anode is formed from a material which allows the provision of a chromium oxide film on the surface thereof, deterioration of the anode may be restrained even if the cathode is conventionally formed from molybdenum, thereby improving the maintenance cycle of the gas laser apparatus. More specifically, even if the sputtering in the cathode causes the cathode material particles to scatter and be affixed on the anode surface, the particles affixed on the anode surface may be prevented from locally forming an insulating substance on the anode surface owing to ununiform oxidation action since the anode surface is covered with a stable thin chromium oxide film, thereby preventing the electric field concentration owing to local formation of the insulating substance.

Figure 8:
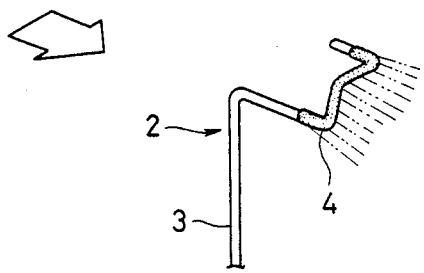
FIG. 8 is a perspective view of a cathode employed in the gas laser apparatus of a third embodiment.

Although the invention is applied to a biaxial cross flow $CO_2$ laser employing the direct-current discharge in the foregoing embodiments, the invention may be applied to other laser apparatus of the type that the discharge electrodes are placed in the atmosphere of the gas mixture as the laser medium without regard to the kind of the gas mixture, for example, axial flow gas lasers, triaxial cross flow gas lasers or the like. Additionally, configurations of the discharge electrodes may not be taken into consideration. For example, the discharge cathode may be formed into a generally Σ-shape as a cathode 9 shown in FIG. 8 as a third embodiment of the invention.

Figure 9:
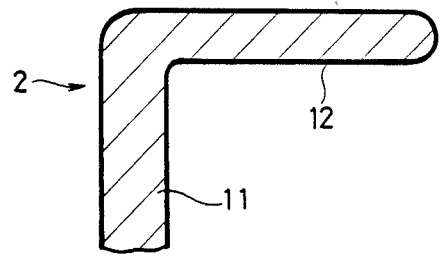
FIG. 9 is a partially cross sectional view of a cathode employed in the gas laser apparatus of a fourth embodiment.

As is shown in FIG. 9 illustrating a fourth embodiment, the cathode 2 may be formed from molybdenum as a base material 11. A titanium coating 12 may be applied to the cathode 2 and then oxidized so that a titanium oxide film is formed on the surface of the cathode 2. The method of applying the titanium coating 12 includes sputtering, ion plating and laser cladding as well known in the art. Of these methods, laser cladding is considered to be a best method since it provides the maximum coating thickness of about 0.4 mm. Further, in order to oxidize the titanium coating 12, the same method as employed in the first embodiment may be applied. Alternatively, the cathode may be heated before the assembling of the laser apparatus so that the titanium coating is oxidized.

The foregoing disclosure and drawings are merely illustrative of the principles of the present invention and are not to be interpreted in a limiting sense. The only limitation is to be determined from the scope of the appended claims.

What we claim is:

1. A gas laser apparatus comprising:
   a cathode;
   an anode with a chromium coating on a surface thereof;
   means for enclosing said cathode and said anode in an atmosphere of a gas mixture as a laser medium; and
   means for causing electric discharge between said cathode and said anode, thereby exciting said gas mixture.

2. A gas laser apparatus according to claim 1, wherein said cathode includes a titanium base and wherein a lightening portion of said cathode has a titanium oxide layer on a surface thereof, said lightening portion corresponding to a portion covered with a glow during said electric discharge.

3. A gas laser apparatus according to claim 1, wherein said cathode includes a molybdenum base and has a titanium layer on a surface thereof and wherein a lightening portion of said cathode has a titanium oxide layer, said lightening portion corresponding to a portion covered with a glow during said electric discharge.

4. A method of making an anode for a gas laser apparatus in which a pair of discharge electrodes are located in an atmosphere of a gas mixture as a laser medium and a DC voltage is applied across said discharge electrodes so that an electric discharge is initiated, thereby exciting said gas mixture, said method comprising the steps of:
   (a) forming a base anode from titanium; and
   (b) mounting said base anode in said gas laser apparatus and oxidizing a surface of said base anode during electric discharge initiated between a cathode and said base anode such that a titanium oxide layer is formed on said base anode.

5. A method of making an anode for a gas laser apparatus in which a pair of discharge electrodes are located in an atmosphere of a gas mixture as a laser medium and a DC voltage is applied across said discharge electrodes so that an electric discharge is initiated, thereby exciting said gas mixture, said method comprising the steps of:
   (a) forming a base anode from molybdenum as a base material;
   (b) applying a titanium coating to said base anode; and
   (c) mounting said base anode in said gas laser apparatus and oxidizing said titanium coating during electric discharge between a cathode and said base anode.

* * * * *